United States Patent
Yeo

(10) Patent No.: US 7,335,132 B2
(45) Date of Patent: Feb. 26, 2008

(54) METHOD FOR REDUCING A TIP-IN SHOCK OF AN AUTOMATIC TRANSMISSION

(75) Inventor: Chang Gi Yeo, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 11/300,116

(22) Filed: Dec. 13, 2005

(65) Prior Publication Data
US 2006/0128522 A1  Jun. 15, 2006

(30) Foreign Application Priority Data
Dec. 13, 2004  (KR) .................... 10-2004-0104963

(51) Int. Cl.
*B60W 10/04* (2006.01)
(52) U.S. Cl. ...................................... 477/109
(58) Field of Classification Search ............ 477/107, 477/109
See application file for complete search history.

(56) References Cited

U.S. PATENT DOCUMENTS 5,468,198 A * 11/1995 Holbrook et al. ........... 477/143
6,269,293 B1 * 7/2001 Correa et al. ............... 701/51

* cited by examiner

*Primary Examiner*—Dirk Wright
(74) *Attorney, Agent, or Firm*—Morgan Lewis & Bockius LLP

(57) ABSTRACT

In the case a tip-in occurs during a downshift control in a coasting state of a vehicle, when an engine torque reduction control condition is satisfied, an engine torque is limited by limiting a throttle opening. The limited engine torque is gradually recovered to a normal torque through a plurality of ramp control processes.

17 Claims, 3 Drawing Sheets

METHOD FOR REDUCING A TIP-IN SHOCK OF AN AUTOMATIC TRANSMISSION

CROSS-REFERENCE TO RELATED APPLICATION

This application claims priority to and the benefit of Korean Patent Application No. 10-2004-0104963 filed in the Korean Intellectual Property Office on Dec. 13, 2004, the entire contents of which are incorporated herein by reference.

BACKGROUND OF THE INVENTION (a) Field of the Invention

The present invention relates to an automatic transmission. More particularly, the present invention relates to a method for reducing tip-in shock in an automatic transmission by limiting engine torque increase through limiting throttle opening when tip-in is detected.

(b) Description of the Related Art

A typical automatic transmission (AT) provides convenience in drivability by automatically shifting gears to a target shift-speed. For such a shifting operation, the AT firstly determines the target shift-speed depending on vehicle speed and throttle opening, and according to a map table of a predetermined shift pattern. The AT then operates various operational elements, such as an off-going clutch and an on-coming clutch, of a multiple speed gear mechanism included in the AT.

When tip-in (i.e., an abrupt hard operation of an accelerator pedal) occurs while a vehicle equipped with such an AT is coasting (that is, while it is under an inertial running in an idle state without operation of the accelerator pedal), the vehicle may experience a shock due to an abrupt increase of an engine torque, and such a shock is usually called tip-in shock.

While a vehicle is coasting, turbine speed in the transmission is typically higher than engine speed, that is, engine speed (Ne)<turbine speed (Nt). This is because the vehicle is not running by the power of the engine but by its own inertial momentum.

When the accelerator pedal is tipped-in in such a coasting situation, the engine speed abruptly rises above the turbine speed. The abrupt change of the engine speed from below the turbine speed to above the turbine speed implies that power transmission direction in a drive train of the vehicle is suddenly changed. In this case, the driver may feel a tip-in shock that is generated by backlash of the drive train.

Therefore, typically, when tip-in is detected during coasting of a vehicle, the ignition timing is dynamically retarded by a predetermined amount such that drive torque may be reduced in order to minimize the tip-in shock. However, the ignition timing retardation amount and the period of the retardation substantially influence responsiveness of acceleration. When the ignition timing retardation amount or the period of retardation is excessively small, torque reduction effect becomes negligible such that the tip-in shock may not be suppressed. When the ignition timing retardation amount or the period of retardation is excessively large, the shock may be reduced. However, in this case, vehicle acceleration may be delayed by an excessive reduction of the drive torque, or un-synchronized acceleration may happen.

In addition, typically, when tip-in is detected during a downshift in a coasting state, only the duty control of the hydraulic pressure of the on-coming clutch is adjusted depending on accelerator pedal operation. In this case, when an excessively large duty of the hydraulic pressure is supplied to the on-coming clutch, the engagement of the on-coming clutch becomes excessively early so as to thereby produce a shift shock.

In addition, when an excessively small duty of the hydraulic pressure is supplied to the on-coming clutch, the engagement of the on-coming clutch becomes excessively delayed such that the engagement thereof occurs only after a run-up so as to thereby also produce a shift shock in this case.

The above information disclosed in this Background section is only for enhancement of understanding of the background of the invention and therefore it may contain information that does not form the prior art that is already known in this country to a person of ordinary skill in the art.

SUMMARY OF THE INVENTION

According to an exemplary embodiment of the present invention, throttle opening is limited when tip-in is detected during a downshift (for example, a 4→3 downshift or a 3→2 downshift) while a vehicle is coasting. Therefore, the engine torque is limited, and accordingly, shift feel and drivability may be enhanced by preventing a tip-in shock.

An exemplary method for reducing tip-in shock in an automatic transmission according to an embodiment of the present invention includes: determining whether an engine torque reduction control condition is satisfied when tip-in occurs during a downshift control in a coasting state; limiting engine torque by limiting throttle opening through control of an ETC when the engine torque reduction control condition is satisfied; and releasing the engine torque limitation.

The limiting of engine torque may include: determining, when the engine torque reduction control condition is satisfied, whether a predetermined first period $\Delta t1$, during which an on-coming clutch duty pressure is maintained at a predetermined duty pressure level, has elapsed after a first time point where the on-coming duty pressure is applied with a maximum hydraulic pressure; and limiting the throttle opening through the control of the ETC when the first period $\Delta t1$ has elapsed.

The releasing of engine torque limitation may include: determining whether a predetermined second period $\Delta t2$ has elapsed after a second time point where a vehicle speed begins changing by the limited throttle opening; a first ramp controlling for gradually increasing, after the predetermined second period $\Delta t2$, the limited torque by a first slope until a third time point where a floating control of the on-coming duty pressure is finished; a second ramp controlling for gradually increasing, after the first ramp controlling, the limited torque by a second slope until a fourth time point where the on-coming duty pressure becomes a final duty pressure of the downshift; and releasing the engine torque limitation, after the second ramp controlling, by gradually increasing the limited torque by a third slope for a predetermined third period $\Delta t3$.

The engine torque reduction control condition may include: a current shifting to be a 4→3 shifting during a coasting of the vehicle; the engine speed to be above 850 RPM; a throttle opening to be above 5%; a coolant temperature to be above 30° C.; and a duty control of the on-coming hydraulic pressure not to be in a shift starting period or a shift finishing period.

The second slope may be steeper than the first slope.

The third slope may be steeper than the second slope.

In a further embodiment of the present invention a system for reducing tip-in shock in an automatic transmission includes at least an engine speed detector, a coolant temperature detector and a throttle opening detector, each generating signals indicative of a respective engine state, an electronic throttle control, and an engine control unit configured to receive said engine state signals and control the electronic throttle control. The control unit programmed to execute instructions for determining whether an engine torque reduction control condition is satisfied when tip-in occurs during a downshift control in a coasting state, controlling the electronic throttle control to limit engine torque by limiting throttle opening when the engine torque reduction control condition is satisfied, and releasing the engine torque limitation.

The instructions for controlling the electronic throttle control may include instructions for determining, when the engine torque reduction control condition is satisfied, whether a predetermined first period $\Delta t1$, during which an on-coming clutch duty pressure is maintained at a predetermined duty pressure level, has elapsed after a first time point where the on-coming duty pressure is applied with a maximum hydraulic pressure, and limiting the throttle opening when the first period $\Delta t1$ has elapsed.

The instructions for releasing the engine torque limitation may include instructions for determining whether a predetermined second period $\Delta t2$ has elapsed after a second time point where a vehicle speed begins changing by the limited throttle opening, gradually increasing, after the predetermined second period $\Delta t2$, the limited torque by a first slope until a third time point where a floating control of the on-coming duty pressure is finished, gradually increasing, after the third time point, the limited torque by a second slope until a fourth time point where the on-coming duty pressure becomes a final duty pressure of the downshift, and releasing the engine torque limitation, after the fourth time point, by gradually increasing the limited torque by a third slope for a predetermined third period $\Delta t3$.

Parameters corresponding to the engine torque reduction control condition are stored in the engine control unit. Such parameters may include the current shifting operation as a 4→3 shifting during coasting, the engine speed as above about 850 RPM, the throttle opening as above about 5%, the coolant temperature as above about 30° C., and the duty control of the on-coming hydraulic pressure as not in a shift starting period nor in a shift finishing period.

A system according to an embodiment of the present invention also may include a shift control unit communicating with the engine control unit and providing signals thereto indicative of the automatic transmission shift state, a shift speed detector communicating with the shift control unit to provide signals indicative of shift speed thereto, and on-coming and off-going transmission clutches controlled by the shift control unit.

DETAILED DESCRIPTION OF THE EMBODIMENTS

An exemplary embodiment of the present invention will hereinafter be described in detail with reference to the accompanying drawings.

Figure 1:
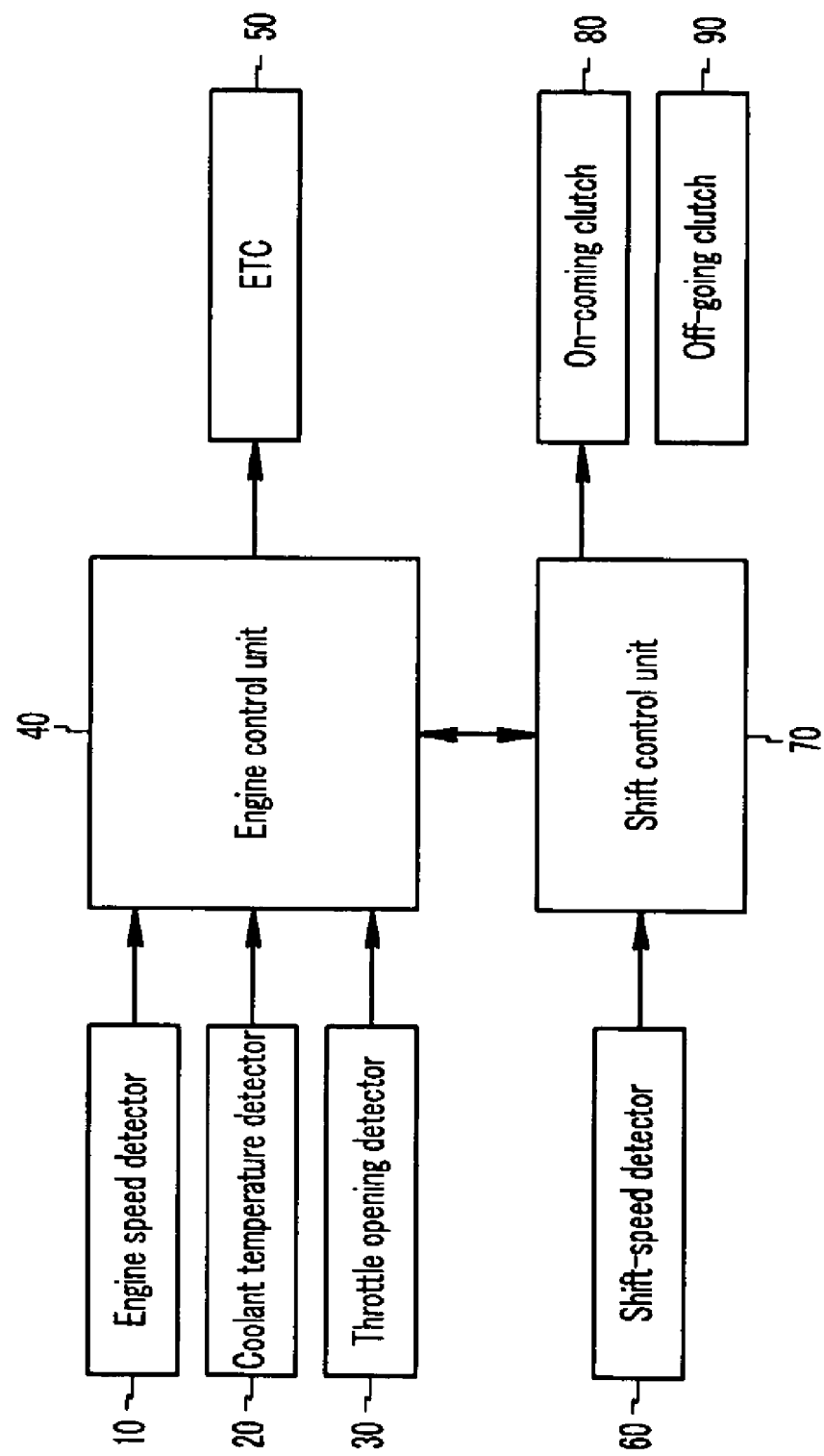
FIG. 1 is a schematic block diagram of an apparatus for reducing tip-in shock in an automatic transmission according to an exemplary embodiment of the present invention.
Figure 2:
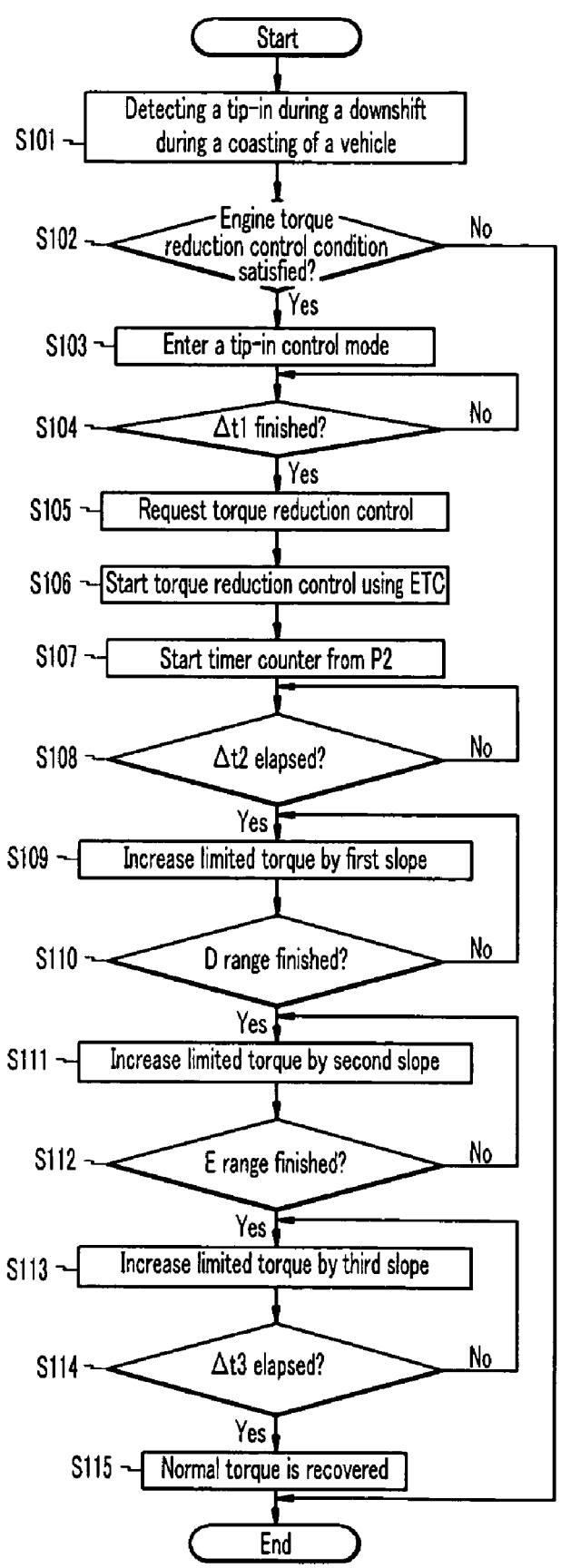
FIG. 2 is a flowchart showing a method for reducing tip-in shock in an automatic transmission according to an exemplary embodiment of the present invention.

FIG. 1 is a schematic block diagram of an apparatus for reducing a tip-in shock of an automatic transmission according to an exemplary embodiment of the present invention.

As shown in FIG. 1, apparatus for reducing a tip-in shock of an automatic transmission according to an exemplary embodiment of the present invention includes an engine speed detector 10, a coolant temperature detector 20, a throttle opening detector 30, an engine control unit 40, an electronic throttle control unit (ETC) 50, a shift-speed detector 60, a shift control unit 70, an on-coming clutch 80, and an off-going clutch 90.

The engine speed detector 10 detects an engine speed by detecting a rotating speed of a crank shaft, and then provides it to the engine control unit 40. The coolant temperature detector 20 detects a temperature of a coolant circulating the engine, and then provides it to the engine control unit 40. The throttle opening detector 30 detects a throttle opening depending on an operation of an accelerator pedal, and then provides it to the engine control unit 40.

The engine control unit 40 and the shift control unit 70 cooperatively function to enable a comprehensive control of shifting. The ETC 50 is controlled according to a torque reduction request of the shift control unit 70, and thereby the throttle opening may be limited. By such an operation, a stable engagement of the on-coming clutch may be enabled since an engine torque reduction control is performed when a tip-in is detected during a downshifting while the vehicle is coasting. The ETC 50, the shift control 70, and the control unit 40 each may comprise a processor, memory and associated hardware, software and/or firmware as may be selected and programmed by a person.

The ETC 50 adjusts the throttle opening in response to a control signal received from the control unit 40. The shift-speed detector 60 detects a current shift-speed, and provides it to the shift control unit 70. When the tip-in is detected during the downshift while the vehicle is coasting, the shift control unit 70 sends a torque reduction request signal to the engine control unit 40, and it controls hydraulic pressure duties of the on-coming clutch 80 and the off-going clutch 90 for achieving the target shift-speed of the downshift.

Hereinafter, operation of an automatic transmission according to an exemplary embodiment of the present invention to reduce tip-in shock during downshift while the vehicle is coasting will be described in detail.

When a driver abruptly operates the accelerator pedal while the shift control unit 70 is performing a downshift control during the coasting state, the engine control unit 40 detects the tip-in at step S101.

Then at step S102, it is determined whether a predetermined engine torque reduction control condition is satisfied.

Figure 3:
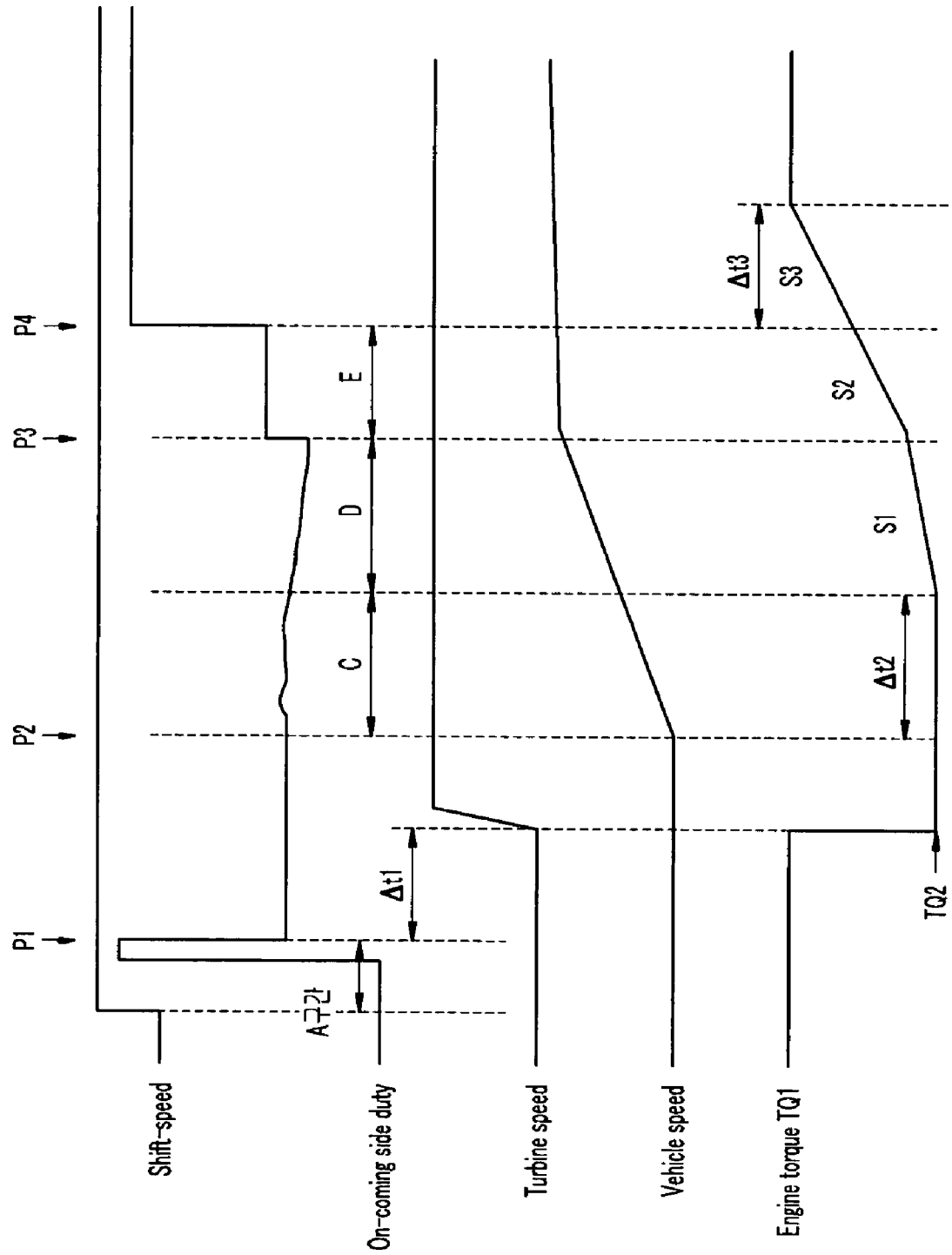
FIG. 3 is a shift pattern diagram in a method for reducing a tip-in shock of an automatic transmission according to an exemplary embodiment of the present invention.

The engine torque reduction control condition includes, for example, a current shifting to be a 4→3 shifting during a coasting of the vehicle, the engine speed to be above 850 RPM, a throttle opening to be above 5%, a coolant temperature to be above 30° C., and a duty control of the on-coming hydraulic pressure not to be in a shift starting period (refer to a range A in FIG. 3) nor in a shift finishing period (refer to a range E in FIG. 3).

When the engine torque reduction control condition is not satisfied at the step S102, a conventional shift control is performed.

When the engine torque reduction control condition is satisfied at the step S102, a tip-in control mode during a downshift is performed at step S103. The following steps are performed for the tip-in control mode during a downshift.

Firstly at step S104, the shift control unit 70 determines whether a predetermined first period Δt1 during which an on-coming clutch duty pressure (i.e., a duty pressure applied to the on-coming clutch) is maintained at a predetermined duty pressure level has elapsed after a first time point where the on-coming duty pressure is applied with a maximum hydraulic pressure.

When the first period Δt1 is determined to have elapsed, at the step S104, the shift control unit 70 requests torque reduction control to the engine control unit 40 at step S105.

In response thereto, at step S106, the engine control unit 40 limits the throttle opening by controlling the ETC 50 such that an intake air amount may be limited.

Therefore, as shown in FIG. 3, the engine output torque reaches a level of TQ2 that is lower than a level of TQ1 corresponding to a pressed level of the accelerator pedal. In addition, the turbine speed increases during the downshift. That is, a time point of the turbine speed increase and a time point of starting the torque reduction are synchronized.

Although the throttle opening is limited and accordingly the engine torque is also limited, the vehicle speed increases since the tip-in state implies a power-on state. At step S107, a timer counter is started at a second time point P2 where the vehicle speed starts increasing.

From the timer counter, it is determined at step S108 whether a predetermined second period Δt2 has elapsed (i.e., whether a C range is finished).

When the predetermined second period Δt2 has elapsed after the second time point P2, a first ramp control (refer to D range in FIG. 3) of the on-coming duty pressure is performed at step S109. In the first ramp control, the limited torque is gradually increased by a first slope S1 until a third time point where a floating control of the on-coming duty pressure is finished.

Then at step S110, the shift control unit 70 determines whether the first ramp control (the D range) is finished.

When the first ramp control is finished, a second ramp control (refer to E range in FIG. 3) is performed at step S111. In the second ramp control, the limited torque is gradually increased by a second slope until a fourth time point P4 where the on-coming duty pressure becomes a final duty pressure of the downshift.

Then at step S112, the shift control unit 70 determines whether the second ramp control (the E range) is finished (i.e., an engagement of the on-coming clutch is finished).

When the second ramp control is finished, the engine control unit 40 releases the torque limitation by gradually increasing the limited torque by a third slope S3 for a predetermined third period Δt3, through steps S113, S114, and S115.

That is, while the limited torque is increasing by the third slope S3 at the step S113, it is determined at the step S114 whether the third period Δt3 has elapsed. When the third period Δt3 has elapsed, the engine torque is recovered to a normal torque at the step S115.

As described above, according to an exemplary embodiment of the present invention, a throttle opening is limited when a tip-in is detected during a downshift while a vehicle is coasting. Therefore, the engine torque is limited, and accordingly, shift feel and drivability may be enhanced by preventing a tip-in shock.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for reducing tip-in shock in an automatic transmission, comprising:
    determining whether an engine torque reduction control condition is satisfied when tip-in occurs during downshift control in a coasting state;
    limiting an engine torque by limiting throttle opening through control of an ETC when the engine torque reduction control condition is satisfied; and
    releasing the engine torque limitation.

2. The method of claim 1, wherein the limiting of the engine torque comprises:
    determining, when the engine torque reduction control condition is satisfied, whether a predetermined first period Δt1, during which an on-coming clutch duty pressure is maintained at a predetermined duty pressure level, has elapsed after a first time point where the on-coming duty pressure is applied with a maximum hydraulic pressure; and
    limiting the throttle opening through the control of the ETC when the first period Δt1 has elapsed.

3. The method of claim 1, wherein the releasing of the engine torque limitation comprises:
    determining whether a predetermined second period Δt2 has elapsed after a second time point where a vehicle speed begins changing by the limited throttle opening;
    a first ramp controlling for gradually increasing, after the predetermined second period Δt2, the limited torque by a first slope until a third time point where a floating control of the on-coming duty pressure is finished;
    a second ramp controlling for gradually increasing, after the first ramp controlling, the limited torque by a second slope until a fourth point where the on-coming duty pressure becomes a final duty pressure of the downshift; and
    releasing the engine torque limitation, after the second ramp controlling, by gradually increasing the limited torque by a third slope for a predetermined third period Δt3.

4. The method of claim 2, wherein the releasing of the engine torque limitation comprises:
    determining whether a predetermined second period Δt2 has elapsed after a second time point where a vehicle speed begins changing by the limited throttle opening;
    a first ramp controlling for gradually increasing, after the predetermined second period Δt2, the limited torque by a first slope until a third time point where a floating control of the on-coming duty pressure is finished;
    a second ramp controlling for gradually increasing, after the first ramp controlling, the limited torque by a second slope until a fourth time point where the on-coming duty pressure becomes a final duty pressure of the downshift; and
    releasing the engine torque limitation, after the second ramp controlling, by gradually increasing the limited torque by a third slope for a predetermined third period Δt3.

5. The method of claim 1, wherein the engine torque reduction control condition comprises:
    a current shifting to be a 4→3 shifting during a coasting of the vehicle;

the engine speed to be above about 850 RPM;
a throttle opening to be above about 5%;
a coolant temperature to be above about 30° C.; and
a duty control of the on-coming hydraulic pressure not in a shift starting period nor in a shift finishing period.

6. The method of claim 1, wherein the second slope is steeper than the first slope.

7. The method of claim 1, wherein the third slope is steeper than the second slope.

8. The method of claim 4, wherein:
the engine torque reduction control condition comprises a current shifting to be a 4→3 shifting during a coasting of the vehicle, the engine speed to be above about 850 RPM, a throttle opening to be above about 5%, a coolant temperature to be above about 30° C., and a duty control of the on-coming hydraulic pressure not in a shift starting period nor in a shift finishing period;
the second slope is steeper than the first slope; and
the third slope is steeper than the second slope.

9. A method for reducing tip-in shock in an automatic transmission, comprising:
determining whether an engine torque reduction control condition is satisfied when tip-in occurs during downshift control in a coasting state;
limiting engine torque when the engine torque reduction control condition is satisfied; and
releasing the engine torque limitation.

10. The method of claim 9, wherein the limiting of the engine torque comprises:
determining, when the engine torque reduction control condition is satisfied, whether a predetermined first period Δt1 has elapsed after a first time point when an on-coming clutch duty pressure is applied and maintained at a maximum hydraulic pressure; and
limiting throttle opening when the first period Δt1 has elapsed.

11. The method of claim 10, wherein the releasing of the engine torque limitation comprises:
determining whether a predetermined second period Δt2 has elapsed after a second time point where a vehicle speed begins changing by the limited throttle opening;
gradually increasing, after the predetermined second period Δt2, the limited torque by a first slope until a third time point where a floating control of the on-coming duty pressure is finished;
gradually increasing, after the third time point, the limited torque by a second slope until a fourth point where the on-coming duty pressure becomes a final duty pressure of the downshift; and
releasing the engine torque limitation, after the fourth time point, by gradually increasing the limited torque by a third slope for a predetermined third period Δt3.

12. The method of claim 9, wherein the engine torque reduction control condition comprises:
a current shifting to be a 4→3 shifting during coasting of the vehicle;
the engine speed to be above about 850 RPM;
a throttle opening to be above about 5%;
a coolant temperature to be above about 30° C.; and
a duty control of the on-coming hydraulic pressure not in a shift starting period nor in a shift finishing period.

13. A system for reducing tip-in shock in an automatic transmission, comprising:
at least an engine speed detector, a coolant temperature detector and a throttle opening detector, each generating signals indicative of a respective engine state;
an electronic throttle control;
an engine control unit configured to receive said engine state signals and control the electronic throttle control, said control unit programmed to execute instructions for
determining whether an engine torque reduction control condition is satisfied when tip-in occurs during a downshift control in a coasting state;
controlling the electronic throttle control to limit engine torque by limiting throttle opening when the engine torque reduction control condition is satisfied; and
releasing the engine torque limitation.

14. The system of claim 13, wherein the instructions for controlling the electronic throttle control comprise instructions for:
determining, when the engine torque reduction control condition is satisfied, whether a predetermined first period Δt1, during which an on-coming clutch duty pressure is maintained at a predetermined duty pressure level, has elapsed after a first time point where the on-coming duty pressure is applied with a maximum hydraulic pressure; and
limiting the throttle opening when the first period Δt1 has elapsed.

15. The system of claim 14, wherein the instructions for releasing the engine torque limitation comprise instructions for:
determining whether a predetermined second period Δt2 has elapsed after a second time point where a vehicle speed begins changing by the limited throttle opening;
gradually increasing, after the predetermined second period Δt2, the limited torque by a first slope until a third time point where a floating control of the on-coming duty pressure is finished;
gradually increasing, after the third time point, the limited torque by a second slope until a fourth time point where the on-coming duty pressure becomes a final duty pressure of the downshift; and
releasing the engine torque limitation, after the fourth time point, by gradually increasing the limited torque by a third slope for a predetermined third period Δt3.

16. The system of claim 15, wherein parameters corresponding to the engine torque reduction control condition are stored in the engine control unit and said parameters comprise:
current shifting operation to be 4→3 shifting during coasting;
engine speed to be above about 850 RPM;
throttle opening to be above about 5%;
coolant temperature to be above about 30° C.; and
duty control of the on-coming hydraulic pressure not in a shift starting period nor in a shift finishing period.

17. The system of claim 16, further comprising:
a shift control unit communicating with the engine control unit and providing signals thereto indicative of the automatic transmission shift state;
a shift speed detector communicating with the shift control unit to provide signals indicative of shift speed thereto; and
on-coming and off-going transmission clutches controlled by said shift control unit.

* * * * *